(12) United States Patent
Evans

(10) Patent No.: US 8,137,579 B2
(45) Date of Patent: Mar. 20, 2012

(54) NON-AQUEOUS HEAT TRANSFER FLUID AND USE THEREOF

(76) Inventor: John W. Evans, Sharon, CT (US)

( * ) Notice: Subject to any disclaimer, the term of this patent is extended or adjusted under 35 U.S.C. 154(b) by 1411 days.

(21) Appl. No.: 10/629,642

(22) Filed: Jul. 29, 2003

(65) Prior Publication Data

US 2004/0099839 A1    May 27, 2004

Related U.S. Application Data

(63) Continuation-in-part of application No. 08/991,155, filed on Dec. 16, 1997, now abandoned, and a continuation-in-part of application No. 08/409,026, filed on Mar. 23, 1995, now abandoned, which is a continuation-in-part of application No. 08/119,514, filed on Sep. 10, 1993, now abandoned.

(51) Int. Cl.
*C09K 7/50* (2006.01)
(52) U.S. Cl. ................. 252/71; 252/73; 252/74; 252/75
(58) Field of Classification Search .................... 252/74, 252/75; 123/41.42
See application file for complete search history.

(56) References Cited

U.S. PATENT DOCUMENTS

| | | | |
|---|---|---|---|
| 4,293,441 A | 10/1981 | Newell et al. | |
| 4,455,248 A * | 6/1984 | Wood | 252/75 |
| 4,550,694 A | 11/1985 | Evans | |
| 5,031,579 A | 7/1991 | Evans | |
| 5,118,434 A | 6/1992 | Meyer et al. | |
| 5,240,631 A | 8/1993 | Mascioli et al. | |
| 5,273,673 A | 12/1993 | Ashrawi et al. | |
| 5,366,651 A | 11/1994 | Maes et al. | |
| 5,387,360 A | 2/1995 | Uekusa et al. | |
| 5,422,026 A | 6/1995 | Greaney | |

FOREIGN PATENT DOCUMENTS

| | | |
|---|---|---|
| JP | 54-155985 | 12/1979 |
| JP | 55-125181 | 9/1980 |
| JP | 03-031388 | 2/1991 |
| JP | 06-033274 | 2/1994 |
| JP | 06-158034 | 7/1994 |
| JP | 08-085782 | 4/1996 |
| JP | 08-183950 | 7/1996 |
| WO | WO 89/09806 | 10/1989 |

OTHER PUBLICATIONS

Chemical Abstracts, 116-86516, "Aqueous and nonaqueous engine coolants based on propylene glycol", Dingley, 1991.
Chemical Abstracts, 120:195478, "Evaluation of nonaqueous propylene glycol as an engine coolant for heavy duty diesel engines", Coughenour et al., 1993.
Hercamp et aL, "*Aqueous Propylene Glycol Coolant for Heavy Duty Engines*", SAE, SP811, 1990, pp. 47-77.

* cited by examiner

*Primary Examiner* — Necholus Ogden, Jr.
(74) *Attorney, Agent, or Firm* — McCarter & English LLP

(57) ABSTRACT

The present invention is directed to a heat transfer system comprising a heat transfer fluid. The heat transfer fluid comprising non-buffered propylene glycol, and at least one propylene glycol soluble additive selected from the group consisting of a molybdate salt, a nitrate compound and an azole compound.

43 Claims, No Drawings

NON-AQUEOUS HEAT TRANSFER FLUID AND USE THEREOF

CROSS-REFERENCE TO RELATED APPLICATION

This is a continuation-in-part, of prior application Ser. No. 08/991,155, filed Dec. 16, 1997 now abandoned, which is hereby incorporated herein by reference in its entirety.

The present application is a continuation-in-part of patent application U.S. Ser. No. 08/409,026, filed Mar. 23, 1995 now abandoned, which is a continuation-in-part of patent application U.S. Ser. No. 08/119,514, filed Sep. 10, 1993 now abandoned.

BACKGROUND OF THE INVENTION

The present invention relates generally to a substantially non-aqueous heat transfer fluid for use in a heat exchange system and, particularly, to a coolant for internal combustion engines.

The coolants that are currently used create continuing environmental problems and raise concerns about toxicity, health effects and disposal problems. In particular, toxicity leading to acute short term oral health effects of coolants upon humans and other mammals is problematic. In addition, chronic health problems associated with coolants often relate to contamination from elemental heavy metal precipitates and toxic inhibitors that are added for water related reactions.

Every year nearly 700 million gallons of antifreeze are sold in the U.S. alone, and about 1.2 billion gallons are sold worldwide. The problem of the inherent toxicity of currently used coolants is exacerbated by estimates that 25% to 50% of this volume is disposed of improperly. One major cause of this pollution is dumping by consumers. While increased consumer awareness can be achieved through education, improper disposal will remain a problem.

Another major source of improper disposal emanates from leakage, spills and overflows in the heavy duty truck and off-road vehicle industry. Experience with heavy duty vehicles shows that it is common to lose 10% of the coolant volume every 12,000 miles (19,312 km) to 18,000 miles (28,967 km). This equates to a leakage rate of one drop per minute, or one gallon per month for the typical highway truck. Even though a coolant leak this small is likely to go unnoticed, it can accumulate into a significant loss. For example, many heavy duty fleets never change coolant but purchase enough antifreeze for loss replacement every year to replace all of the coolant in each of their vehicles.

In some heavy-duty operations, overflows and venting losses account for far more coolant loss than the previously mentioned leaks at the water pump, hose clamps or radiator core. When a heavy-duty truck radiator without an overflow tank is topped off, a quart or more of coolant is usually lost due to overflow from the coolant expanding upon heating of the engine. It is to be noted that even if small spills and leaks of coolant eventually biodegrade with little impact upon the environment, such leaks present a toxic danger to wildlife while they exist as a liquid and by contamination of heavy metals they carry (suspended), due to cooling system erosion and corrosion.

Current formulations of engine coolants typically utilize the characteristics of water as the primary heat removal fluid. The water content of a coolant is typically 30% to 70% by weight, depending upon the severity of the winter climate.

Another component of a conventional engine coolant is a freeze point depressant. Currently, the freeze point depressant in most cases is ethylene glycol (EG), which is used in a range of 30% to 70% by volume to prevent freezing of the water during winter. In some warm weather areas, freezing temperatures are not encountered and water with only a corrosion inhibitor package is used.

Moreover, an additive package containing numerous different chemicals is initially added to the freeze point depressant to form an antifreeze concentrate, and eventually blended with water to form the coolant. These additives are designed to prevent corrosion, cavitation, deposit formation and foaming, and are each in concentrations of 0.05% to 3% by weight of the final coolant.

Recently propylene glycol (PG), with inhibitors, has gained some acceptance as a freeze point depressant, mostly because of it's lower toxicity rating than EG. It is the water fraction and the delicate balance of the water content to the freezepoint depressant that has thwarted attempts by vehicle manufacturers and coolant formulators to develop a "world coolant" which is applicable from the artic to the tropics and to all engines; light and heavy duty. Currently a ratio of 70% EG concentrate to 30% water is required for the artic, but this ratio is not acceptable (due to convective transfer loss) in the tropics which typically require a 40% EG to 60% water ratio. Additionally the heavy duty engine manufacturers require a high concentration of sodium nitrate, as an additive for iron cavitation (see below), which is not desirable in light duty engines. The complexity of balancing various water to EG (or PG) ratios and different additive formulations has created a recurring problem in the field of improper freeze protection and clogged radiators and heater cores, due to mis-formulation of inhibitor additives. These problems, as will be discussed further below, exist because of the need for a substantial water fraction in the make-up of the cooling fluid, termed an "aqueous coolant".

In addition, contaminants build up in the coolant as the engine is used and result from thermal and oxidative breakdown of glycol, lube oil and fuel accumulation, or metal corrosion and erosion products from the cooling system components.

Finally, as mentioned above, supplemental coolant additives are used in heavy duty service to prevent cavitation erosion of cylinder liners (iron) and to replenish inhibitor chemicals depleted with service. Supplemental coolant additives are not used or required in passenger cars which have a coolant life of 20,000 miles (32,186 km) to 30,000 miles (48,279 km). Heavy-duty service usually demands 200,000 miles (321,860 km) to 300,000 miles (482,790 km) before coolant replacement and hence the need to periodically replenish inhibitors. Examples of commonly used supplemental coolant additives include sodium nitrate, dipotassium phosphate, sodium molybdate dihydrate, and phosphoric acid.

Cylinder liner cavitation is another prime example of the complex reactions which occur when a substantial portion of the coolant is made up of water. When, for example, a mixture of 50% water and 50% EG is used (50/50 EGW) in a heavy duty engine the vapor pressure of the coolant is very high, about 600 mm/Hg, and under high load conditions large amounts of water vapor are produced on the coolant side of the cylinder wall. As the water vapor ultimately collapses around the cylinder wall, the energy released from the phase change (gas to liquid) impacts the wall and small amounts of iron are eroded, on an ongoing basis. Sodium nitrate is added to chemically limit the amount of vapor impacting the cylinder wall.

Supplemental coolant additives must be chemically balanced with the coolant volume, which is costly to control and can be catastrophic to the cooling system components, and the engine, if improperly done. If the amount of the supplemental coolant additives in the coolant is too low, corrosion and cavitation damage to the engine and cooling system components will occur, but if the amount is too high, additives will "fall-out" of solution and eventually clog radiator and heater cores. Another difficulty with supplemental coolant additives is that they are difficult to properly dissolve in an aqueous solution and may resist going into a final solution, as a supplemental additive, which causes additional clogging problems.

The acute oral toxicity of spent antifreeze is largely determined by the amount of ethylene glycol used. Thus, additives and contaminants have a lesser effect on coolant toxicity. Regardless of size, spills and leaks can pose an acute oral toxicity danger to wildlife and pets.

Glycols make up 95% by weight of the antifreeze/coolant concentrate, and after blending with the water, about 30% to 70% by volume of the coolant used in the vehicle. Conventional antifreeze has for years been formulated with EG.

A major disadvantage of using EG as a freeze point depressant for engine coolants is its high toxicity to humans and other mammals if ingested. Toxicity is generally measured in accordance with a rating system known as the $LD_{50}$ rating system, which is the amount of substance expressed in grams per kilogram of body weight, when fed to laboratory rats in a single dose, which will cause an acute oral toxic poisoning. A lower $LD_{50}$ value indicates a higher toxicity (smaller amounts of substance required to be lethal). An $LD_{50}$ rating of less than or equal to 20.0 grams of substance per kilogram of body weight can classify a material as hazardous. Thus, because EG has an $LD_{50}$ rating of 6.1 g/kg, EG is hazardous by this rating system. Moreover, EG is a known toxin to humans at relatively low levels, reported as low as 0.398 g/kg. Consequently, EG is classified by many regulatory authorities as a dangerous material. When ingested, EG is metabolized to glycolic and oxalic acids, causing an acid-base disturbance which may result in kidney damage. EG also has the added complication of a sweet smell and taste thereby creating an attraction for animals and children.

In addition to the difficulties that arise from the use of EG, serious problems may result from the instability of the additives that are used in current coolant formulations. An EG-based concentrate requires 3% to 5% water content in order not to freeze at +7.7° F. (−13.5° C.). Water is also added to all known coolant concentrates so that additives can be dissolved during formulation and remain in suspension during extended periods of storage.

Although a small amount of water, as discussed above, is intentionally added to EG/PG concentrate to keep the water soluble additives in solution, while being stored, it is not adequate for long periods of time. The additives must be agitated, periodically, in order to remain in solution until added to water as a final coolant mixture. If storage as a concentrate is too long a period (over 6-8 months) then the water soluble additives begin to "fall-out" of suspension and will accumulate in the bottom of the container as a "gel". The "gelled" additives will not return to solution even with agitation. This problem, however, is not limited to the stored concentrate only. Even when fully mixed, as 50/50 EG or PG, the water soluble additives will "gel-out" if not agitated (the engine run) regularly. This can be a severe problem for engines used in stationary emergency pumps and generators as well as military and other limited use engines.

One difficulty with the large water fraction of the diluted engine coolant, typically a 50/50 ratio of concentrate to water, is the emergence of precipitates of heavy metals, such as lead and copper contaminants, that become suspended in the water portion of the circulating coolant in the engine. The water reacts with lead and copper materials from radiators which are the source of not only brass, and thereby copper, but also lead solder.

Water is also highly reactive with light alloys, such as aluminum, and the water fraction of the coolant can generate large amounts of aluminum precipitates, which increases at an increasing proportion with higher coolant temperatures. Water soluble additives are used for these reactions, but cannot totally eliminate the reaction, and aluminum is constantly lost to the 50/50 EG or PG coolant.

Cooling systems contain many different metals and alloys, and corrosion of these metals by coolants has been unavoidable because of the inclusion of water with the diol-based antifreezes, such as ethylene glycol or propylene glycol. Corrosion occurs because of the formation of organic acids in the coolant, such as pyruvic acid, lactic acid, formic acid, and acetic acid. The organic diols produce acidic oxidation products when in the presence of hot metal surfaces, oxygen from either entrapped air or water, vigorous aeration, and metal ions, each of which catalyze the oxidation process. Moreover, formation of lactic acid and acetic acid is accelerated in coolant solutions at 200° F. (93.3° C.) or above while in the presence of copper. Formation of acetic acid is further accelerated in the presence of aluminum in coolant solutions at 200° F. (93.3° C.) or above.

Among the metals and alloys found in cooling systems, iron and steel are the most reactive in the formation of acids, whereas light metals and alloys, such as aluminum, are considerably less reactive. As the oxidation of diols progresses, the level of organic acids formed with the water fraction rises and the pH of the coolant decreases, and therefore the corrosion of the metal surfaces increases.

Currently known and utilized coolants include buffers to counteract these organic acids. The buffers act to create a coolant with a higher initial pH of approximately 10 or 11. Thus, as the oxidation occurs, the pH decreases accordingly. Some examples of typically utilized buffers include sodium tetraborate, sodium tetraborate decahydrate, sodium benzoate, phosphoric acid and sodium mercaptobenzothiazole.

Buffers, in turn, also require water in order to enter into and remain in solution. As the buffer portion of the solution becomes depleted over time, the water fraction of the coolant reacts with the heat, air and metals of the engine, and as a result, the pH decreases because of the acids that form. Thus, corrosion remains a large problem in coolants that utilize water.

In fact, all known coolant formulations require the addition of water to solubilize additives used as buffers and anti-foam agents and for prevention of aluminum corrosion. Examples of such additives include phosphates, borates, silicates or phosphoric acids. In addition, these water soluble additives require heat, extreme agitation, and extensive time for the water to react and cause the additives to dissolve.

These requirements add significant cost and complexity to the formulation and packaging of antifreeze concentrates. The energy costs and time required for blending, before packaging, are a major factor in the processing costs. Also, the constant requirement to monitor the formulating process to assure a "proper blend" has become extremely costly as many of todays' additives, for aqueous concentrates, interfere with each other and can cause an incomplete solution and failure of the formulation process.

All currently used and previously known coolants require inhibitors to control the corrosive effects from the required water content. The inhibitors must be balanced so that they do not react with each other because that would otherwise minimize their individual purposes. For instance, phosphates and borates would decrease the protection of silicates on aluminum. Moreover, the inhibitors must not be in excess concentration, which is usually done to extend the depletion time, because that causes damage to system components. For example, "fall-out" from solution causes plugging of radiators and heaters. In addition, silicates, silicones, borates and phosphates are abrasive and erode heat exchanger tubes and pump impellers. Nevertheless, the inhibitors must still exist in a concentration which is adequate to protect all metals.

Thus, the additive package that is included in known coolant formulations typically consists of from 5 to 15 different chemicals. These additives are broken down into major and minor categories, depending upon the amount used in an engine coolant formulation:

| MAJOR (0.05% to 3%) | MINOR (<0.05%) |
|---|---|
| Buffer | Defoamer |
| Corrosion inhibitors | Dye |
| Cavitation inhibitors | Scale inhibitor |
| | Surfactant |
| | Chelates |

In addition, some of the additives themselves are considered toxic, such as borates, phosphates, and nitrates. Thus, not only do all known coolant formulations include additives that require heat, extreme agitation and extensive time for the water to react and cause the additives to dissolve, but the additives themselves are sometimes toxic. Further, the additives require complex balancing which accommodates the prevention of interference between the additives, while also preventing the excessive presence of any one additive in the coolant.

SUMMARY OF THE INVENTION

The present invention solves the aforesaid problems by providing a propylene glycol (PG) based coolant that is essentially non-aqueous. The coolant does not have a substantial amount of water. The utilization of a "neat" (substantially water-free), PG base liquid, as well as "neat" PG dissolvable corrosion inhibitors, allows the formulation of the present invention to require much less time to blend, to be lower in blending costs and to be less problematic. The instant invention, of a substantially water-free diol coolant (preferably propylene glycol) utilizes a unique formulating process (with all the previously mentioned benefits), which will be further detailed below along with the unique characteristics of the fully formulated coolant as being the first single formula "world coolant". The invention creates a coolant with a stable solution of inhibitors which has a long term shelf life, is non-hazardous with low toxicity and will not freeze in a "neat" state, in either storage or in use.

A cooling system such as disclosed in U.S. Pat. Nos. 4,550, 694 and 5,031,579 which utilizes the PG based coolant in accordance with the present invention can advantageously operate at a significantly lower pressure at or near ambient level, while also restricting water absorption. Not only does the system thereby allow for a simple and stable additive package, but the reduced pressure of the cooling system also eliminates stress of the components. The innate lubricous nature of the coolant of the present invention is benign to rubber, and allows the pump seals, hoses and system components to normally last 150,000 miles (241,395 km) or more, which dramatically lowers the loss of coolant to the environment because of leaks, while also decreasing overheating.

The fully formulated non-aqueous coolant will operate in any engine constructed similarly to those disclosed in the aforementioned patents, and under any environmental conditions from −70° F. ambients to +130° F. or more. It is applicable in the artic or the tropics, with no changes required. Because it is non-aqueous there are no mixture ratios to change, for different environments, and the additives, (all PG soluble), will stay in suspension, without agitation, for many years of storage. There is no need for a heavy duty engine formulation because there is no cylinder liner erosion from cavitation. Because there is no cavitation erosion there is no need for the addition of sodium nitrite (which is water soluble only), which negates the need to add water for the dissolving of the additive, if it were required. It is surprising to find the complex benefits of a substantially water-free coolant and how one corrected problem originally caused by the existence of water (cavitation) eliminates the need to add water (dissolving of sodium nitrate with water).

Because the coolant of the present invention is initially free of water, and the system with which the coolant is used isolates the hot coolant from air and moisture, there is no major chemical reaction from which significant levels of acids may be formed. Since two of the major catalysts for acid formation, air and water, are nonexistent at the outset, as well as through the life of the system, there is no reason to add buffering agents in the formulation of the coolant. Therefore, the need to raise the water content of the coolant for additive solubility is eliminated, because only PG soluble additives need to be employed. Further, the coolant formulation of the present invention can accommodate the existence of water, preferably below a concentration of 0.25% by weight, as an impurity, and during use water (absorbed as a contaminant) can be permitted in concentrations of preferably below about 5.0% by weight, without requiring any buffering agents.

The water-free nature of the coolant formulation and systems operation of the present invention also eliminates other water, air, heat and metal based reactions and their water soluble additives. The reactions and additives that are eliminated include:

1. Anti-foam reactions/Silicones and polyglycol additives,
2. Aluminum corrosion/Silicates,
3. Cavitation corrosion/Nitrites,
4. Scale inhibitors/Polyacrylates, and
5. Anti-fouling/Detergents.

Whereas the water soluble additives of known coolants require heat, extreme agitation and extensive time for the water to react and cause the additives to dissolve, the present invention utilizes a preferred additive package of three PG liquid soluble additives which do not require water to enter into or remain in solution, require no heat and only a short time to dissolve, with only slight agitation needed.

The formulation may be prepared by two different methods. Method (1) includes the formation of a liquid solution of additives and a diol fluid (preferably propylene glycol) which are pre-mixed in a concentration "additive" tank and, after complete solution is achieved, are then finally blended into the bulk tank which is filled with industrial grade PG diol coolant (rated less than 0.01% water content, by weight). Method (2) includes the introduction of the additives in powder form directly into the bulk blending tank which is filled with bulk PG diol coolant (same industrial grade).

Recycling of the coolant of the present invention is easier and less costly than in known coolant formulations. During recycling, distillation of aqueous coolants is costly and time consuming. Because water is restricted to minimal amounts in the present invention, the requirement of distilling out the water fraction is substantially reduced or eliminated. Thus, recycling of the present invention simply involves filtering out suspended solids and old additives, with distillation requirements greatly reduced or eliminated.

The present invention is also more conducive to storage. Aqueous coolants and additives suffer from "fall-out" of additives during extended storage, but the additives of the present invention, which do not require water to remain in solution, can be maintained in long periods of storage without the need for periodic agitation.

Because it is intended that this coolant will become a "world coolant" the unique feature of extended storage capability is extremely important. As the supply line fills with a "mono-coolant," multiple mixtures will become single items and the shelf aging will significantly increase to much longer intervals. These extended periods will not be of concern, however, because the coolant formulation will remain stable, no matter how long the storage period, and dissolved additives will not "fall-out" of solution causing improper corrosion protection and transient additive gels which can clog radiators and heater cores. It should be noted that should the non-aqueous coolant be required to merely add one water soluble inhibitor, into the formulation, then the above described extended shelf life would not exist and a major feature of the present invention will be lost. This, of course, is not the case as it is interrelated to the unique substantially water-free, low acidity discovery of the invention.

DETAILED DESCRIPTION OF THE PREFERRED EMBODIMENT(S)

In a preferred embodiment of the invention, PG is chosen as the essentially non-aqueous heat transfer base liquid. PG has an $LD_{50}$ rating of 33.7 g/kg and is therefore non-hazardous. Moreover, PG has an acrid taste and smell and is thus not attractive to animals. "Neat" PG provides a lower freezing point than EG and does not require the presence of water to function as a freeze point depressant. "Neat" PG freezes at −76° F. (−60° C.), whereas "Neat" EG freezes at 7.7° (−13.5° C.).

Although the preferred embodiment of the invention solely utilizes PG as the non-aqueous heat transfer base liquid, PG could be used in combination with EG. The use of EG in a mixture with PG, however, is not as beneficial as using PG alone because of increased toxicity. However, in order to retain the present invention's other characteristics, the mixture must contain at least 40% PG. A coolant utilizing such a mixture would retain some of the characteristics of the preferred embodiment, but would be more toxic and hazardous. Other glycols are much more toxic than PG. Diethylene glycol, dipropylene glycol, triethylene glycol, tripropylene glycol, and ethylene glycol have $LD_{50}$ ratings of 16.6 g/kg, 14.8 g/kg, 22.0 g/kg, 3.0 g/kg, and 6.1 g/kg, respectively.

In addition, because of the high temperatures that can exist in an engine, the boiling point of the base liquid is also an important factor in formulating a coolant. Propylene glycol has a satisfactory boiling point of 369° F. (187.2° C.), but the boiling point of ethylene glycol, 387.1° F. (197.3° C.), is at the upper limit for acceptable boiling points. If the boiling point is higher, then the coolant and critical engine metal temperatures can become too hot. Other glycols have much higher boiling points, which are too excessive. For instance, diethylene glycol has a boiling point of 472.6° F. (244.8° C.), dipropylene glycol has a boiling point of 447.8° F. (231° C.), triethylene glycol has a boiling point of 545.9° F. (285.5° C.), and tripropylene glycol has a boiling point of 514.4° F. (268° C.).

The instant invention also utilizes only additives that are soluble in PG, and thus does not require water for the additives to enter into or remain in solution. In addition to being soluble in the PG, each chosen additive is a corrosion inhibitor for one or more specific metals. A nitrate compound, such as sodium nitrate, is utilized as an additive to inhibit corrosion for iron or alloys containing iron, such as cast iron. Although sodium nitrate's primary function is to prevent corrosion for cast iron, it also slightly inhibits solder and aluminum corrosion. An azole compound, such as tolyltriazole, functions as a corrosion inhibiting additive for both copper and brass. Moreover, tolyltriazole is also beneficial by slightly increasing the pH because of its basic effect. A molybdate compound, such as sodium molybdate, primarily functions as a corrosion inhibitor for lead from solder, but is also beneficial in decreasing corrosion for all other metals.

The choice of PG soluble additives thus depends on which metals are of concern with regards to corrosion. Currently, sodium nitrate, tolyltriazole and sodium molybdate would all be required to formulate a "world wide" coolant because of the presence of the particular metals currently in use in cooling system components. However, an additive could be reduced or eliminated if the particular metal it acts on is eliminated. For example, if lead-based solder is eliminated, then the content of sodium molybdate could be reduced, or would not be required at all.

The additives can be present in a range from a concentration of about 0.05% by weight to about 5.0% by weight, and more preferably not above about 3.0% by weight. Solutions below about 0.1% by weight are not as effective for long life inhibition, while solutions over about 5.0% will suffer "fall-out." In the preferred embodiment, each additive is present in a concentration of about 0.3% to about 0.5% by weight depending upon the service life of the coolant.

Another attribute of the present invention is that neither magnesium nor aluminum corrosion occur, and additives for these purposes are therefore eliminated. Light alloys will not corrode with PG.

The preferred three additives exhibit many advantages. For instance, the additives are not rapidly depleted and may be formulated to last for heretofore unobtainable service periods, without change or additive replenishment for up to about 10,000 hours or 400,000 miles (643,720 km) in many forms of engines and vehicles. Another advantage of these PG liquid soluble additives which do not require water is that the additives go into suspension readily and remain in suspension, even in extreme concentrations, without falling out of solution, when each additive is present in concentrations of up to 5.0% by weight. Moreover, a significant degrading effect does not exist when the additives interact with each other. In addition, the additives are not abrasive, and the additives and coolant protect all metals, including magnesium, for a minimum of 4,000 hours or 150,000 miles (241,395 km).

The non-aqueous soluble additives in the present invention do not become depleted over extended hourly usage or mileage, and thus the need for supplemental coolant additives is ordinarily eliminated. Nevertheless, if it is desirable to add supplemental coolant additives, the non-aqueous formulation exhibits advantages because the supplemental coolant additives will more readily enter stable solution with the present invention than in aqueous coolants. Moreover, the proper balance of supplemental coolant additives is easier to maintain, with a broad possible range of concentrations from about 0.05% by weight to about 5.0% by weight.

Here again the aforesaid advantages of the unique formulating process, of the present invention, also exist in the field if and when the supplemental addition of additives is required. The supplements may be added in either dry powder form, or as a dissolved concentrate directly to the cooling system. They may be added to a cool engine (50° F. or above) and will dissolve into solution merely by idling the engine, without any chance of clogging the radiator, or heater cores. Also, because the target base solution is about 0.3% by weight and the saturated limit is about 5.0% there is no real chance of the mechanic adding an unacceptable amount of supplemental additive. Conversely, current water-based additives must be added to a hot coolant, then run hard (to enter solution) and are easily over saturated causing a common occurrence of radiator and heater damage.

For purposes of this invention, "non-aqueous" means water is present as an impurity in the coolant formulation, in no greater than a concentration of about 0.5% by weight. Although an increase in water is not desired during use, the present invention can accommodate the presence of some water. Because PG is a hygroscopic substance, water can enter the coolant from the atmosphere, or water can escape from the combustion chamber into the coolant from a combustion gasket leak into the cooling chamber. Although the essence of the invention is to avoid water, the invention will permit some water; however, increase of the water fraction during use is preferably restricted to below about 5.0% by weight, and more preferably, below about 3.0% by weight. Further, the invention and related cooling systems can tolerate water up to a maximum concentration of about 10% by weight.

The coolant of the present invention remains non-hazardous in use with low toxicity in preferred compositions containing more than about 84.5% PG. The corrosion inhibitors used are also listed as non-hazardous by the EPA. In addition, these additives are used, preferably, in a concentration at or below about 0.3% by weight, which is considered non-hazardous by the EPA. Furthermore, the water content is preferably below about 0.25%, as formulated, and remains below about 5.0% in use which eliminates the precipitates of heavy metals and causes the coolant to remain non-hazardous in use and thus may be disposed of as such.

Aqueous coolants and cooling systems can cause the formation of entrapped air and violent vapor bubbles (cavitation) in the cooling system, and thus lead to high lead and copper erosion from the effects of the vapor/gases and the reaction of water with the metals. However, the present invention's non-aqueous nature eliminates the air and vapor bubbles and thus reduces the heavy metal precipitates. Moreover, tolyltriazole and sodium molybdate are utilized as corrosion inhibitors for these metals.

The elimination of water in the present invention relieves the coolant of catalysts that lead to acidic oxidation products. Not only is water itself involved in oxidation reactions in currently formulated coolants, but it is also a source for oxygen. Thus, if water is not present, or is at a minimal amount, corrosive effects on metals and alloys is dramatically reduced.

The pH scale reflects the acidity or alkalinity of an aqueous solution. Therefore, the pH scale is merely an indicator of acidity that will exist once air and water are present to form acids and react with the metal. Because the present invention and the systems in which it is used avoid water, a coolant that would otherwise have a pH level as low as 3 or 4 if water were present would still not exhibit unacceptable corrosive effects on the metals and alloys in the engine.

As long as traditional acidity values remained a concern then the related formulation would always require buffering agents to make the initial coolant more "basic" (a higher pH of 10 to 14). With the addition of buffers; phosphates, borates, carbonates and the like, about 5% water must be added to the coolant formulation in order to cause these water soluble buffers to enter into solution. However, ultimately to remain in solution a water content of about 10% is needed in order to assure there is no "fall-out" of the buffering agents which would result in gelling and clogging of the cooling system. Hence more water content and more need for acidity control.

The preferred embodiment of the coolant formulation is as follows:

| Components | "A" (Subject Coolant) | "B" (Conventional Coolant with Antifreeze Added) |
|---|---|---|
| 1) Glycol | | |
| a. Propylene wt. % | >99 | — |
| b. Ethylene wt. % | — | 46.75 |
| 2) Water wt. % | <0.1 | 50.83 |
| 3) Tolyltriazole wt. % | 0.3 | 0.10 |
| 4) Sodium Nitrate wt. % | 0.3 | 0.05 |
| 5) Sodium Molybdate wt. % | 0.3 | 0.05 |
| 6) Sodium Metaborate wt. % | — | 0.50 |
| 7) Sodium Hydroxide wt. % | — | 0.12 |
| 8) Sodium Benzoate wt. % | — | 1.50 |
| 9) Sodium Nitrite wt. % | — | 0.05 |
| 10) Sodium Metasilicate wt. % | — | 0.10 |

The compositions of the present invention may be prepared by the following methods:
(1) A. Concentrate Additive Tank; 400 Gals PG
  Inhibitors;
    TTZ 5.0% by weight 168.0 lbs.
    Molybdate salts 5.0% by weight 168.0 lbs.
    Sodium Nitrate 5.0% by weight 168.0 lbs.
  Blending time 20 mins./room temp 60°-70° F.
  Standard paddle or propeller, or air agitation
  B. Bulk Final Formulation; (6500 gals total)
  Main tank 6100 gals P.G./Industrial grade
  Add concentration additive (400 gals)
  Blending time 30 mins./room temp 60°-70° F.
  Standard paddle/prop, or air agitation
(2) Powder Direct Addition; (6500 gals. total)
  Main tank bulk PG coolant 6500 gals.
  Inhibitors; direct addition
    TTZ 0.3% by weight 168.0 lbs.
    Molybdate salt 0.3% by weight 168.0 lbs.
    Sodium Nitrate 0.3% by weight 168.0 lbs.
  Blending time 1.5 hours/room temp 60°-70° F.
  Standard paddle/prop, or air agitation Either method (1) or (2) will result in the same final solution of a stable fully formulated non-aqueous coolant in a period of time that is about ⅙ the time typically required (currently about 8 hours) to properly formulate the presently used Ethylene, or Propylene, Glycol antifreeze coolant concentrate.

EXAMPLE 1

Corrosion Test/Laboratory

ASTM #D-1384 (Modified)

The first example examines a corrosion test for engine coolants in glassware. Description: Six specimens, typical of metals present in an engine coolant system, are totally immersed in the test coolant. Normally the coolant is aerated, by bubbling air up through the glassware, and kept at a test temperature of 190° F. (88° C.) for 336 hours. These tests, however, and the results tabulated below, were performed with the following modifications to more effectively prove the benefits of the invention. Thus, both test coolants ("A" and "B") were operated at a control temperature of 215° F. (101.6° C.) to simulate severe duty use, and the subject coolant "A" was tested without aeration being applied in order to more closely approximate its operation in a non-aqueous cooling system as described in U.S. Pat. Nos. 4,550,694; 4,630,572 and 5,031,579. However, the conventional antifreeze, coolant "B," was aerated in the normal manner of the #D-1384 test. At the completion of the test, corrosion was measured by weight loss of each metal specimen.

Results
[ASTM #D-1384 (Modified)]

| METAL | Δ WT "A" COOLANT (Mg) | Δ WT "B" COOLANT (Mg) | ASTM STD. |
|---|---|---|---|
| 1) Light Alloy Engines (Aluminum or Magnesium Head and Block) | | | |
| Magnesium | −1.3 | >−1,000 | — |
| Aluminum | +0.3 | −21.1 | −30 |
| Steel | −0.5 | −3.9 | −10 |
| Copper | −3.7 | −7.4 | −10 |
| Solder | −9.0 | −19.2 | −30 |
| Brass | −0.6 | −5.1 | −10 |
| 2) Combined Alloy Engines (Aluminum [partial] with iron, or all iron) | | | |
| Cast Iron | +1.0 | −6.2 | −10 |
| Aluminum | +2.0 | −18.6 | −30 |
| Steel | 0 | −4.3 | −10 |
| Copper | −3.0 | −8.9 | −10 |
| Solder | −6.1 | −19.7 | −30 |
| Brass | 0 | −4.7 | −10 |

The results with a positive gain in weight occur because of plating out of transients from the other specimens used in the test, and those metals that gained the transient weight virtually did not lose any weight due to corrosion themselves.

EXAMPLE 2

Corrosion Test/Laboratory

ASTM #D-4340 (Modified)

This example examines corrosion of cast aluminum or magnesium alloys in engine coolants under heat rejecting conditions. Description: A cast aluminum alloy specimen, typical of that used for engine cylinder heads, or blocks, is exposed to an engine coolant solution temperature at 275° F. (135° C.) and at a pressure of 28 psi (193 kPa). An ASTM prescribed corrosive water is used to make up the water fraction of the 50/50 EG-water test coolant sample (Coolant "B"), which was not modified. The test is then modified for the subject coolant sample (Coolant "A"), so as to simulate true operating conditions of the non-aqueous PG coolant and system. Thus, not only is the use of corrosive water eliminated, which renders operation of the test in a non-aqueous state, but the test pressure is also reduced to 2 psi (13.79 kPa), which is approximately ambient pressure.

A heat flux is established through the specimen and the test is carried out for one week, which is 168 hours. The heat transfer corrosion is measured by the weight change in the specimen, measured by the number of milligrams lost by the specimen. The test provides a critical evaluation of the coolant solution's ability to inhibit aluminum, as well as magnesium, corrosion at a heat rejecting surface.

Results
[ASTM #D-4340 (modified for Coolant "A"; 2 PSI)]

| METAL | Δ WT "A" COOLANT (Mg) | Δ WT "B" COOLANT (Mg) | ASTM STD. |
|---|---|---|---|
| Aluminum | 0.067 | 1.61 | <2 |
| Magnesium | 0.18 | 5.79 | <2 |

EXAMPLE 3

Field Test

A 3.8 L V-6 engine was operated "over the road" for a test period of 55,000 miles (88,511.5 km). The vehicle was configured to the specifications of the U.S. Pat. No. 5,031,579 and filled with subject coolant "A." There was no draining or replacing of the coolant during the test period. A metal specimen bundle was placed with the full flow of the engine coolant stream (lower hose) and was kept submerged in the coolant at all times. Performance of the test coolant's ability to inhibit metal corrosion was evaluated by comparing the results in milligrams lost of the specimen at the end of the test period to ASTM test standards.

In Service Vehicle Test Results
(Road Operation of 55,000 miles (88,511.5 km))

| METAL | Δ WT "A" COOLANT (Mg) | ASTM STD. |
|---|---|---|
| Cast Iron | −2.8 | −10 |
| Aluminum | +0.2 | −30 |
| Steel | −1.1 | −10 |
| Copper | −1.3 | −10 |
| Solder | −3.7 | −30 |
| Brass | −0.9 | −10 |
| * pH at start | +5.1 | NA |
| * pH at finish | +4.9 | NA |

* (Testing requires the delution of 50% with water)

While the preferred embodiment of the invention has been disclosed it should be appreciated that the invention is susceptible of modification without departing from the scope of the following claims.

EXAMPLE 4

Field Test

A Class-8 diesel tractor & trailer truck was constructed, as a test, in accordance with FIG. 1A, combined with FIG. 1B as described in U.S. Pat. No. 5,868,105, which is incorporated herein by reference. The coolant of the present application is formulated to work with, and maximize, the operating characteristics of the Class-8 diesel tractor & trailer truck. The apparatus described in the '105 patent, and the placement of the apparatus in accordance with the patent, assures that the operation of the engine & cooling system, combined with a predetermined coolant vapor pressure, will maintain the coolant at a low water content of below 2.5 percent (which is a vapor pressure of 900 mm/HG @ 200 F).

During the testing of the coolant, and the system, in the class-8 tractor (an all new, in 1993, Freightliner with a Detroit Diesel, Series 60 diesel engine) an unexpected result occurred. The truck was operated in a North American Van Lines Fleet, and ran a route between the U.S. East and West coasts. The route traveled over the Rocky Mountains during each coast to coast run. The purpose of the test was to perform a long distance run, on the coolant (over 600,000 miles, without a change of the original base fluid charge during the entire test. The truck was also placed in service in order to gain knowledge regarding field service technician's limitations when operating a Fleet vehicle with an unfamiliar unique non-aqueous coolant. The test has gone longer than originally anticipated and has presently, at the filing date of this application, accumulated over 750,000 miles, during a period of 10½ years.

Unavoidably, during the 10½ year period, small leaks would occur while on the road and service technicians would top up the cooling system with small amounts of water. Periodically the coolant would be tested and the water fraction would be found as high as 6 to 7 percent (a vapor pressure of 180 to 200 mm/Hg @ 200 F), and the PH as low as 2.5 (extremely acidic). The system worked well and the water fraction after each occurrence was observed to work it's level back down to 2.0 to 2.5 percent, over a period of 30, to 45 days. However, the extreme pH level remained a concern as all known cooling system chemistry predicted that the high pH level would cause a failure in the system within months, ie; high corrosion of the pump impeller, the radiator tubes, heater core, thermostat, as well as other components. It was believed the corrosion would be most active, and quite severe during the periods the coolant was at a water fraction above 5.0% (160 mm/Hg @ 200 F). However, the test went forward, using the same coolant, in order to gain the long term effect data which was the original purpose.

The first unexpected result came when, after several of the improper cycles of 2.5%, up to 7.0%, and back down to 2.5% (V.P.: 90.0, to 180.0, back down to 90.0 mm/Hg) it was found that there was no loss in coolant additive. The cooling system would be topped up with non-aqueous propylene glycol, and the additive level would remain constant. It was then determined that the Vapor Pressure of the water at 200 F (about 800 mm/Hg) being about 10 times that of the propylene glycol, was able to "desorb", and lower the water fraction as described in the '105 patent, without carrying along any of the admixed additives of the base coolant, and thereby did not lower the additive content of the coolant. Although considerable amounts of water have been inadvertantly added to the coolant, and then subsequently driven off, there has been no need to add and replacement additives, to the system's coolant, during the entire 10 and ½ years & 750,000 miles of operation. The coolant formulation, starting with a water fraction of 0.5% and essentially remain below 5.0% (V.P.: 35.0 mm/Hg to 160 mm/Hg @ 200 F), and the three basic additives in the range of 1.5 to 3.5 weight percent each, is ideal for any non-aqueous system which will "desorb" the water fraction.

The second, and most surprising, unexpected result was discovered during an interim period cooling system physical inspection at about 600,000 miles. It was at that point that concerns over the repeated periods of exposure to high pH levels, in the range of 2.5 to 4.0 pH, became troubling. All current knowledge, and experience, in the coolant industry predicted that pH exposure in those ranges, even for short periods of time, would cause severe corrosion. These pH levels are especially troubling due to what was currently, and previously known about the base fluid propylene glycol (PG). The base nonaqueous PG is not generally good corrosively for some metals. While it is good corrosively for light alloys (aluminum, and magnesium), it is not good for iron, and copper. Any lowering of the pH level will further aggravate the tendency of the PG to corrode iron, and copper, and increase the rate of the reaction when heat is present. Therefore, it is generally accepted that the lower pH level is, of the PG, the more rapidly the additives will be depleted.

The cooling system of the truck, and engine, was drained and the coolant was captured and stored. The components, and the engine cooling jackets, were then dried and disassembled. Surprisingly there were nor signs of any corrosion. Everything that was predicted to exhibit severe corrosion, by industry standards, was found to be in almost as good as new condition. There was no evidence of erosion of the pump impeller, or the tubing of the radiator, or the heater core. The engine and system were then reassembled, the original retained coolant was put back in, and the truck was returned to service with the test continuing. It appears that the coolant's balance of vapor pressures (glycol to water), especially starting at a low level in the area of 35 mm/Hg @ 200 F, is again ideally suited for any non-aqueous system which has the ability to desorb, or remove any water fraction, which subsequently contaminates the coolant. Because the starting point, before the contamination is low, the coolant will "desorb" quickly before the low pH level can damage any components. Also, as described above, because the additives do not deplete, during the "desorbing" process, the corrosion resistance remains at a high level and component damage is avoided. This again is a critical reason for the starting point of the water fraction to be set at a low vapor pressure, about 35.0 mm/Hg @ 200 F. If the base level is higher than a subsequent improper addition of water will raise the total vapor pressure to a level which is too high and the desorption rate will be very rapid and additives with be caused to leave with the water fraction exhausting from the coolant. Also the period of time where the coolant will have a high water fraction, and a very low pH, will be extended and an increased rate of corrosion will occur. Currently the results of this test program makes us believe that the ideal range required is a water fraction which starts at 0.5% (VP: 35.0 mm/Hg @ 200 F), and does not rise to a level exceeding 7.0% (VP: 200 mm/Hg @ 200 F), but most preferably not exceeding 5.0% (VP: 160 mm/Hg @ 200 F).

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A heat transfer system comprising a non-aqueous heat transfer fluid,
   the heat transfer fluid comprising propylene glycol containing less than about 0.5 weight percent water and about 0.05 to about 5.0 weight percent of at least one propylene glycol soluble additive selected from the group consisting of a molybdate salt, nitrate compound and an azole compound, wherein the heat transfer fluid contains no additive that requires water in the heat transfer fluid to dissolve the additive or enable the additive to function.

2. The heat transfer system of claim 1 wherein the heat transfer fluid includes from about 84.5 to about 99.85 weight percent propylene glycol.

3. The heat transfer system of claim 1 wherein the said molybdate salt is sodium molybdate.

4. The heat transfer system of claim 1 wherein said nitrate compound is sodium nitrate.

5. The heat transfer system of claim 1 wherein said azole compound consists of tolyltriazole.

6. The heat transfer system of claim 1 wherein the said propylene glycol is present in a concentration of about 94.5% to about 99.85% by weight, and the propylene glycol soluble additive comprises a mixture of sodium molybdate, sodium nitrate and tolyltriazole.

7. The heat transfer system of claim 1 wherein said propylene glycol is present in a concentration of about 98.5% by weight, and said propylene glycol soluble additive comprises a mixture of about 0.5% sodium molybdate by weight, about 0.5% sodium nitrate by weight, and about 0.5% tolyltriazole by weight.

8. The heat transfer system of claim 1 wherein the heat transfer system is an internal combustion engine heat exchange system.

9. The heat transfer system of claim 1 wherein the heat transfer system is a motor vehicle engine heat exchange system.

10. A non-aqueous heat transfer fluid composition effective for use in heat exchange systems comprising propylene glycol containing less than about 0.5 weight percent water and about 0.05 to about 5.0 weight percent of at least one propylene glycol soluble additive selected from the group consisting of a molybdate salt, a nitrate compound and an azole compound, wherein the heat transfer fluid contains no additive that requires water in the fluid to dissolve the additive or to enable the additive to function.

11. The heat transfer fluid of claim 10 wherein the heat transfer fluid includes from about 84.5 to about 99.85 weight percent propylene glycol.

12. The heat transfer fluid of claim 10 wherein said molybdate salt is sodium molybdate.

13. The heat transfer fluid of claim 10 wherein said nitrate compound is sodium nitrate.

14. The heat transfer fluid of claim 10 wherein said azole compound consists of tolyltriazole.

15. The heat transfer fluid of claim 10 wherein said propylene glycol is present in a concentration of about 94.5% to about 99.85% by weight, and the propylene glycol soluble additive comprises a mixture of sodium molybdate, sodium nitrate and tolyltriazole.

16. The heat transfer fluid of claim 10 wherein said propylene glycol is present in a concentration of about 98.5% by weight, and said propylene glycol soluble additive comprises a mixture of about 0.5% sodium molybdate by weight, about 0.5% sodium nitrate by weight, and about 0.5% tolyltriazole by weight.

17. A method of cooling a heat exchange system which comprises circulating a composition in said system, said composition comprising propylene glycol containing less than about 0.5 weight percent water and about 0.05 to about 5.0 weight percent of at least one propylene glycol soluble additive selected from the group consisting of a molybdate salt, a nitrate compound and an azole compound, wherein the heat transfer fluid contains no additive that requires water in the fluid to dissolve the additive or to enable the additive to function.

18. The method of claim 17 wherein said molybdate salt is sodium molybdate.

19. The method of claim 17 wherein said nitrate compound is sodium nitrate.

20. The method of claim 17 wherein said azole compound consists of tolyltriazole.

21. The method of claim 17 wherein said propylene glycol is present in a concentration of about 94.5% to about 99.85% by weight, and the propylene glycol soluble additive comprises a mixture of sodium molybdate, sodium nitrate and tolyltriazole.

22. The method of claim 17 wherein said propylene glycol is present in a concentration of greater than about 99.0% by weight, and said propylene glycol soluble additive comprises a mixture of about 0.3% sodium molybdate by weight, about 0.3% sodium nitrate by weight, and about 0.3% tolyltriazole by weight.

23. The method of claim 17 wherein the heat exchange system is an internal combustion engine heat exchange system.

24. The method of claim 17 wherein the heat exchange system is a motor vehicle engine heat exchange system.

25. A non-aqueous heat transfer fluid composition effective for use in heat exchange systems consisting essentially of a non-buffered propylene glycol and about 0.05 to about 5.0 weight percent of at least one propylene glycol soluble additive selected from the group consisting of a molybdate salt, a nitrate compound and an azole compound, the composition comprising less than about 0.5 weight percent water.

26. The heat transfer fluid composition of claim 25 wherein the heat transfer fluid composition includes from about 84.5 to about 99.85 weight percent non-buffered propylene glycol.

27. The heat transfer composition of claim 25 wherein said molybdate salt is sodium molybdate.

28. The heat transfer composition of claim 25 wherein said nitrate compound is sodium nitrate.

29. The heat transfer composition of claim 25 wherein said azole compound consists of tolyltriazole.

30. The heat transfer composition of claim 25 wherein said propylene glycol is present in a concentration of about 94.5% to about 99.85% by weight, and the propylene glycol soluble additive comprises a mixture of sodium molybdate, sodium nitrate and tolyltriazole.

31. The heat transfer composition of claim 25 wherein said propylene glycol is present in a concentration of about 98.5% by weight, and said propylene glycol soluble additive comprises a mixture of about 0.5% sodium molybdate by weight, about 0.5% sodium nitrate by weight, and about 0.5% tolyltriazole by weight.

32. A method of cooling a heat exchange system which comprises circulating a composition in said system, said composition consisting essentially of propylene glycol containing less than about 0.5 weight percent water and about 0.05 to about 5.0 weight percent of at least one propylene glycol soluble additive selected from the group consisting of a molybdate salt, a nitrate compound and an azole compound, the composition comprising less than about 0.5 weight percent water, wherein the heat transfer fluid contains no additive that requires water in the fluid to dissolve the additive or to enable the additive to function.

33. The method of claim 32 wherein said molybdate salt is sodium molybdate.

34. The method of claim 32 wherein said nitrate compound is a sodium nitrate.

35. The method of claim 32 wherein said azole compound consists of tolyltriazole.

36. The method of claim 32 wherein said propylene glycol is present in a concentration of about 94.5% to about 99.85% by weight, and the propylene glycol soluble additive comprises a mixture of sodium molybdate, sodium nitrate and tolyltriazole.

37. The method of claim 32 wherein said propylene glycol is present in a concentration of greater than about 99.0% by weight, and said propylene glycol soluble additive comprises a mixture of about 0.3% sodium molybdate by weight, about 0.3% sodium nitrate by weight, and about 0.3% tolytriazole by weight.

38. The method of claim 32 wherein the heat exchange system is an internal combustion engine heat exchange system.

39. The method of claim 32 wherein the heat exchange system is a motor vehicle engine heat exchange system.

40. A non-aqueous heat transfer fluid for use in a heat transfer system comprising:
   a. propylene glycol;
   b. ethylene glycol in the range of between 0 and 60 weight percent of the total weight of the propylene glycol and the ethylene glycol in the heat transfer fluid; and
   c. about 0.05 to about 5.0 weight percent of at least one additive soluble in propylene glycol selected from the group consisting of a molybdate salt, nitrate compound, and an azole compound, wherein the heat transfer fluid contains no additive that requires water in the fluid to dissolve the additive or to enable the additive to function, and wherein the resulting heat transfer fluid contains less than about 0.5 weight percent water.

41. The heat transfer fluid of claim 40, wherein the molybdate salt is sodium molybdate.

42. The heat transfer fluid of claim 40, wherein the nitrate compound is sodium nitrate.

43. The heat transfer fluid of claim 40, wherein the azole compound is tolyltriazole.

* * * * *